United States Patent Office 3,086,596
Patented Apr. 23, 1963

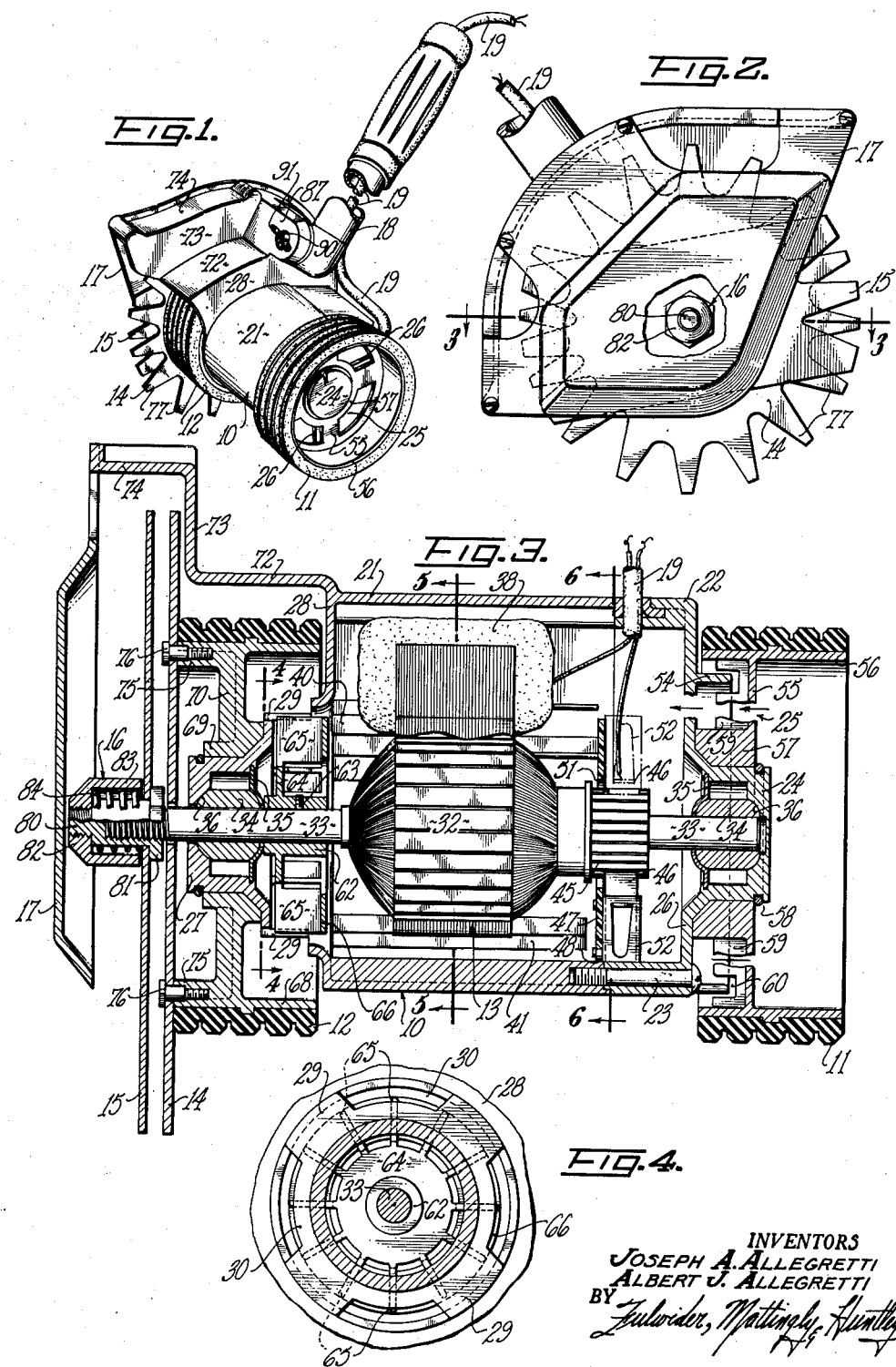
April 23, 1963 J. A. ALLEGRETTI ET AL 3,086,596
LAWN TRIMMER AND EDGER
Filed Oct. 17, 1960 2 Sheets-Sheet 1
INVENTORS
JOSEPH A. ALLEGRETTI
ALBERT J. ALLEGRETTI
BY
ATTORNEYS

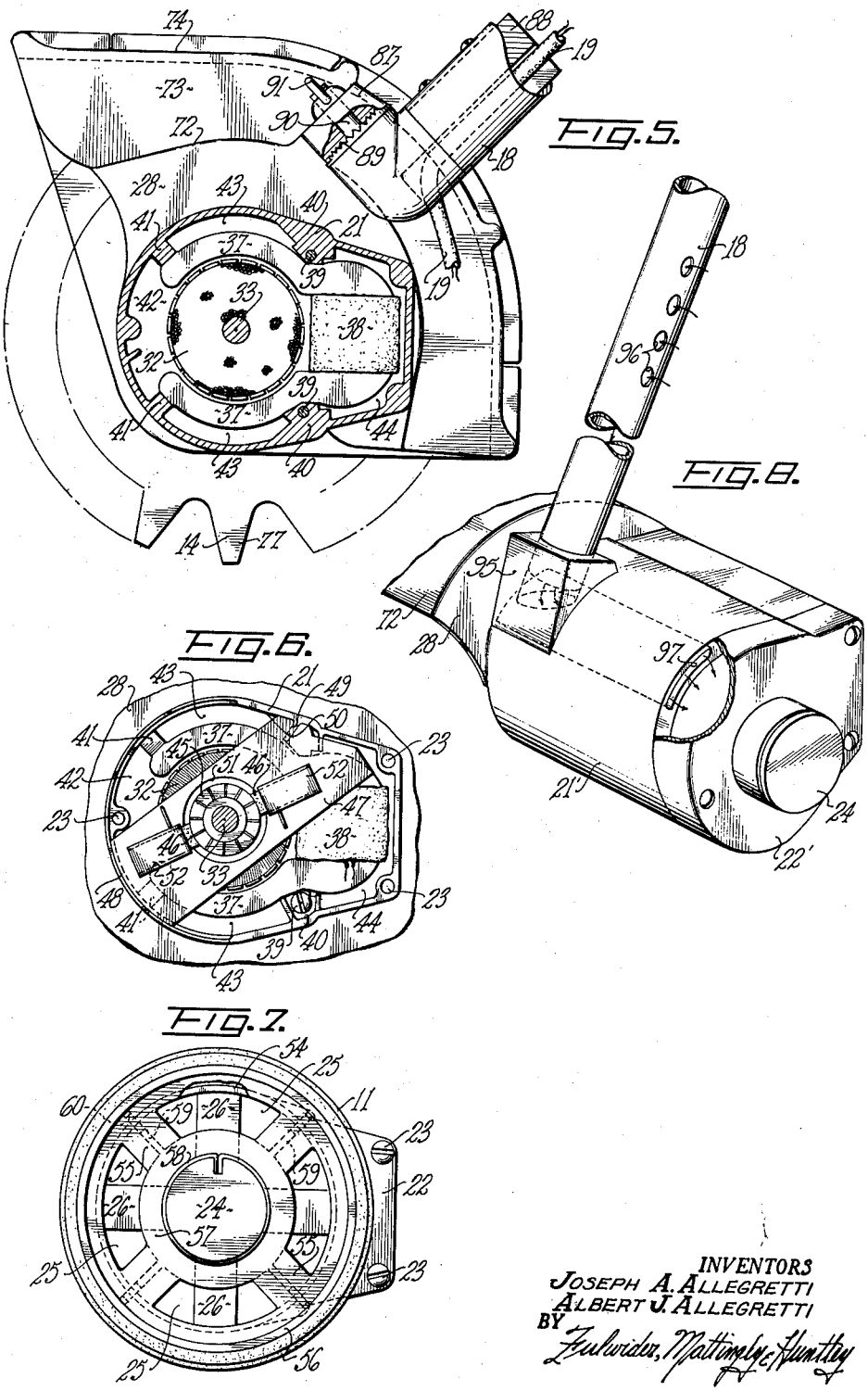

3,086,596
LAWN TRIMMER AND EDGER
Joseph A. Allegretti and Albert J. Allegretti, both of 7232 Fulton Ave., North Hollywood, Calif.
Filed Oct. 17, 1960, Ser. No. 62,933
4 Claims. (Cl. 172—15)

The present invention relates generally to lawn maintenance equipment and more particularly, to an electric lawn edger and trimmer.

There are a number of problems in connection with lawn trimmers and edgers of the electrically powered type, as distinguished from the gasoline engine powered type, the overcoming of which are among the objects of our invention. Primarily, because of the environmental conditions under which the electric motors in lawn trimmers and edgers must operate, they sometimes tend to have a relatively short service life. These electric motors are customarily of the high speed A.C. type, having the axis of the armature offset from the axis of the supporting wheels. This arrangement permits variation of the cutting depth of the blade, but also tends to cause sharp variations in the load on the blade and, consequently, on the motor and greatly tends to increase stalling and heating of the motor. In addition, previously available electric lawn trimmers and edgers have had inadequate means for protecting the motor against dirt. Accordingly, the combination of motor heat and dirt has frequently resulted in motor breakdowns or greatly reduced the service life of the implement and our invention has overcome these and other defects.

An important object of our invention is to provide an improved electric lawn trimmer and edger incorporating a novel relationship of supporting wheels, cutting blade, guide blade, motor axis and control handle whereby to avoid imparting shocks to the motor as a result of radical and sudden variations of cutting depth and to increase the balance and controllability of the implement.

Another important object of the invention is to provide an improved electric lawn trimmer and edger incorporating an improved motor configuration that permits reduction of the cutting blade diameter without any loss in cutting efficiency, but providing the advantage of minimizing the force of reactive shocks transmitted from the blade to the motor armature.

It is also an object of the invention to provide a lawn trimmer and edger with highly efficient air cooling means for the electric motor that inhibits the entry of dirt into the motor casing whereby the air passages remain unobstructed, the motor remains clean, and motor life is thereby increased.

The invention also has for an object the provision of an improved guide means adjacent the cutting blade that is substantially self-cleaning so as to avoid clogging and danger of binding the cutting blade.

A further object is to provide an improved automatically acting clutch means to prevent stalling of the cutter blade from causing stalling of the motor.

Yet another object of the invention is to provide an electric lawn edger and trimmer of greatly simplified construction, being smaller and of lighter weight, but without any sacrifice in strength and durability, this being achieved, in part, by coaxially supporting the armature and wheel bearings.

The foregoing and other objects and advantages of our invention will be apparent from the following description when taken in conjunction with the annexed drawings wherein:

FIGURE 1 is a broken perspective view of an electric lawn trimmer and edger embodying our invention;
FIGURE 2 is a partial right side elevational view;
FIGURE 3 is a sectional view taken along the line 3—3 of FIGURE 2, through the coaxial wheel and armature bearings;
FIGURE 4 is a sectional view taken on the line 4—4 of FIGURE 3 and particularly illustrating details of the air exhaust means;
FIGURE 5 is a sectional view taken on the line 5—5 of FIGURE 3, showing the configuration of the motor assembly;
FIGURE 6 is a sectional view taken on the line 6—6 of FIGURE 3;
FIGURE 7 is a partial left end elevational view; and
FIGURE 8 is a partial perspective view of an alternate embodiment of the invention particularly illustrating another form of air cooling passages.

Referring now to the drawings for the general arrangement of the invention and, in particular, to FIGURE 1, the presently preferred embodiment of the invention has a motor housing assembly 10 adapted at opposite ends to support a pair of wheels 11 and 12 coaxially with the armature shaft of an electric motor designated generally at 13. A star blade guide 14 is affixed to the outer end face of the right hand wheel 12 so as to be rotated along with the wheel. The armature shaft protrudes outwardly beyond the guide 14 and is drivingly connected to a cutter blade 15 through the medium of an automatic overload clutch means 16.

The guide 14, cutter blade 15 and clutch 16 are protected by a skid plate 17 that is rigidly affixed to the corresponding end of the motor housing assembly 10. An elongated handle 18 is pivotally adjustably connected to the top side of the motor housing and has its axis intersecting the common axis of the wheels 11, 12 and motor 13. An electrical cord 19 extends through the handle 18 for ultimate connection to the motor 13. When the handle 18 is in the adjusted position shown in FIGURE 1, the implement is used as an edger, the cutter blade 15 being vertically disposed. When it is desired to use the implement as a trimmer, the handle 18 is adjusted to an angular position relative to the plane of the skid plate 17. The implement can then be rested on the skid plate 17 with the cutter blade 15 horizontally disposed for trimming use.

More specifically, the motor housing comprises an assembly of a large casting 21 and a smaller casting 22 that are held in assembled relationship by a plurality of suitable fasteners 23. The small casting 22 has an end wall provided with an integrally formed hub portion 24 for mounting the wheel 11, and the end wall of the casting is further provided with air inlet passages 25, defined between arms 26 extending radially outwardly from the hub portion of the end wall to the sides of the casting 22.

For supporting the other wheel 12, the larger casting 21 also has an integrally formed hub portion 27 on a radially disposed end wall 28. The hub portion 27 is supported by a plurality of arms 29 extending axially outwardly from the end wall 28, the arms being equally circularly spaced apart to leave a plurality of air exhaust passages 30.

The motor 13 is a series-universal type and includes an armature 32 on a drive shaft 33. It will be noted that the housing hub portions 24 and 27 are hollow and both have seats 36 for a spherical bronze bearing 34 whereby the opposite ends of the drive shaft 33 are rotatably supported in the hub portions. Each of the bearings 34 is held on its seat 36 by a washer-like retainer 35, the edge of the retainer being held by swedging a portion of the material of the hub over the retainer.

Referring now to FIGURE 5, it will be noted that the motor 13 has a generally horseshoe shaped field assembly which permits the armature drive shaft 33 to be spaced closer to the ground surface then would otherwise be possible. This field assembly includes a pair of arcuately extending poles 37 on diametrically opposite sides of the armature 32. The poles 37 comprise opposite arms of horseshoe shaped plates shaped to fit around the top and bottom quadrants of the armature 32 as viewed in FIGURE 5, the plate centers being within a field coil winding 38 behind the armature. The field assembly is held in place by a pair of suitable fasteners 39 extending through clips on the field assembly and into suitable bosses 40 provided within the large casting 21. Referring to FIGURE 5, it will be seen that the pair of bosses 40 and another pair of ribs 41 formed integrally with the inner surface of the casting 21 and extending axially thereof serve to index and hold the field assembly in spaced relationship to the interior surface of the casting. With this mounting a plurality of air circulation passages 42, 43 and 44 are defined within the housing assembly 10 and around the motor 13.

A brush assembly for the motor 13 is mounted in the manner best seen in FIGURES 3 and 6. A pair of carbon brushes 46 are mounted for contact with a commutator ring 45 by a mounting plate 47. This plate is made of a piece of insulating material and has the plan configuration illustrated in FIGURE 6. The plate 47 is keyed into a position extending diametrically with respect to the axis of the armature drive shaft 33 by one curved end 48 received in a corresponding slot formed in the end face of the casting 21. The other end of the plate 47 has a key slot 49 that receives a rib 50, comprising an axially extending continuation of one side of one of the bosses 40. The mounting plate 47 is thus positioned in the plane of the open end of the casting 21.

The plate 47 has a central opening 51 through which the commutator ring portion 45 of the armature 32 extends. A pair of tubular members 52 are mounted on opposite sides of the opening 51 to slidably contain the brushes 46, the members 52 also serving as terminal posts for series connection of the armature and field of the motor 13. Spring means (not shown) are provided for biasing the brushes 46 into contact with the segments of the commutator ring.

In the embodiment of the invention shown in FIGURE 1, the motor 13 is cooled by air drawn in axially through spokes of the left wheel 11 to pass through the housing assembly 10 and centrifugally outwardly through the end of the motor housing which mounts the other wheel 12. Cooling air is thus drawn into the motor housing at a position remote from the cutter blade 15, and the debris thrown by the cutter blade, and air is exhausted around the inside of the rim of the right wheel 12 in such a manner as to force the debris to be thrown in a direction away from the air passage in through the wheel 11.

As is shown in FIGURE 3, the small motor housing casting 22, on its end wall, is formed with a cylindrical axially extending flange 54 that surrounds the air inlet passages 25. The wheel 11 has four spokes 55 interconnecting a wide rim 56 and a hub 57 that is journaled on the hub portion 24 of the casting 22 and held in place by a snap ring 58. Each wheel spoke 55 on its inner face is formed with an axially extending rib 59 formed with a notch 60 to provide a clearance space for the cylindrical flange 54 of the housing casting 22.

From an examination of FIGURE 3, it will be seen that the wheel 11 has considerable axial length outwardly of the spokes 55. With the wheel mounting means just described practically all of the cooling air is forced to enter into the motor housing assembly 10 in an axial direction through the rim of the wheel 11. Because of the presence of the cylindrical flange 54 on the casting 22, little air can be admitted through the tortuous passage defined between the face of the wheel 11 adjacent the casting 22 and around the flange 54. The cooling air is thus almost entirely admitted in an axial direction between the spokes 55 of the wheel and into the inlet passages 25 of the casting 22.

To draw the cooling air through the motor housing, the shaft 33 mounts a centrifugal impeller 62 having its hub section secured to the shaft by a set screw 63. This impeller is mounted just inside of the hub section 27 of the large casting 21 within the annular space surrounded by the axially extending integral arms 29. The impeller has a small circumferentially extending flange 64 at its axially outermost end from which a plurality of radially directed blades 65 extend outwardly. A washer-like ring 66, axially spaced inwardly from the flange 64, is integrally formed with the axially inner ends of the blades 65, in substantially the same plane with the axially inner end of the hub of the impeller. An annular space is thus defined between the inner edge of the ring 65 and the hub of the impeller 62 through which the cooling air is drawn to be centrifugally impelled by the blades 65 in radially outward direction through the air outlet passages 30 defined between the arms 29 of the casting 21.

The right wheel 12 has a wide rim 68 connected to a hub 69 by an imperforate or solid flange 70. Accordingly, the air exhausted through the outlet passages 30 is prevented from proceeding in axial direction but must escape around the rim 68 of the wheel.

Referring to FIGURE 1, it will be seen that the wall 28 of the casting 21 extends radially outwardly above the portion of the casting enclosing the motor 13. The outer edge of this protruding portion of the wall 28 has an integral axially outwardly extending arcuate wall 72 partially enclosing the wheel 12. An integral wall 73 extends further radially outwardly from the wall 72 and, in turn, is bounded by an arcuately extending wall 74 partially enclosing the cutter blade 15 and guide 14.

Referring now to FIGURE 3, it will be observed that the wheel 12 extends axially outwardly beyond the plane of the wall 73. The rim 68 of the wheel 12 has a plurality of equally circularly spaced-apart and axially outwardly facing bosses 75 that are tapped to receive suitable fasteners 76 whereby to mount the guide 14 coaxially with the wheel 12. Thus, as the implement is pushed along the ground the guide 14 rotates with the wheel 12, being driven thereby. As is shown in FIGURE 2, the guide 14 is generally star shaped in configuration, having a plurality of teeth 77. When the implement is pushed along the ground a new one of the teeth 77 is always presented in ground engaging downwardly pointing position to cooperate with the cutting action of the cutter blade 15. As the star teeth 77 are rotated through the space within the wall 74, air escaping around the rim 68 of the wheel 12 tends to blow material stuck on the star teeth 77 from the blade so as to aid in maintaining it in unclogged, clean condition.

Referring again to FIGURE 3, the shaft 33 has an exteriorly threaded end protruding outwardly beyond the plane of the guide 14 to mount the blade 15 and clutch means 16. This end of the drive shaft threadedly mounts a cup shaped nut 80 having an enlarged hexagonal head 81. A shell nut 82 is, in turn, threadedly engaged with a reduced diameter threaded end portion of the nut 80 and a skirt portion 83 of the nut 82 defines an annular space with the exterior of the nut 80. The cutter blade 15 is coaxially journaled on the nut 30 against the axially outer face of the hexagonal head 81, behind the axially inner end of the nut 82. A compression spring 84 is coiled within the annular space and biases the cutter blade 15 against the hexagonal head 81. With this construction of the clutch means 16, in the event that the cutter blade 15 encounters obstacles tending to halt it, such a braking effect is absorbed by the clutch means and not transmitted to the shaft 33 and, therefore, momentary overloads on the motor 13 are avoided.

For pivotally mounting the handle 18, the casting 21 has a boss 87 and the tubular handle 18 fixedly mounts at its lower end an elbow insert 88. The insert 88 and boss 87 have confronting scroll faces, as indicated at 89, to hold the insert 88 and handle 18 at a variety of angularly adjusted positions relative to the boss 87. A threaded stud 90 extends normally outwardly from the scroll face of the insert 88 and through an aligned bore formed through the boss 87. A wing nut 91 threadedly engages the exposed end of the stud for locking the handle 18 in angularly adjusted position.

As shown in FIGURE 5, this mounting means for the handle 18 is adapted to maintain the handle with its axis, if prolonged, intersecting the common axis of the shaft 33, wheels 11 and 12, guide 14 and blade 15 in all adjusted positions of the handle 18. In FIGURE 1, the handle 18 is shown as locked in place in a position paralleling the plane of the cutter blade 15 and the implement is used as an edger when the handle is in this position. When desired to use the implement as a trimmer, the wing nut 91 is loosened and the handle 18 then turned in clockwise direction through approximately 45 degrees, as viewed in FIGURE 1, after which the wing nut 91 is once again tightend. The implement can be rested on the skid plate 17 with the cutter blade 15 horizontally disposed and used for trimming. We have found that when used as either a trimmer or edger, the previously described relationship of the axes of the handle 18 and the shaft 33 provides a very good balance enabling one to readily control the implement, despite the torque of the motor.

FIGURE 8 shows an alternatnve means of air cooling the electric motor of an edger. It will be understood that this embodiment may be substantially identical to that shown in FIGURES 1 through 7 and therefore will be described only with respect to the specific points of difference.

The edger has a motor housing made up of castings 21' and 22' that are generally similar in overall configuration to the castings 21 and 22. However, the casting 21' incorporates a hollow socket 95 adapted to fixedly receive the lower end of a tubular handle 18'. This handle is formed with a plurality of air inlet openings 96 spaced in foot or two above ground level and air enters these openings to pass through the hollow socket 95.

The casting 21' is interiorly formed with an axially extending passage 97 which receives incoming air from the tubular handle 18 and conducts it to that end of the casting 21' to which the casting 22' is affixed. The air exists from the passage 97 into the casting 22' and is thereafter pulled through the motor housing by the impeller 62 in the manner previously described.

Unlike the casting 22, the casting 22' is preferably completely imperforate so that the only possible source of air entrance into the motor housing is through the openings 96 in the tubular handle 18'. We have found that this arrangement is very successful in preventing the entry of dirt into the motor housing, because of the relatively high elevation of the openings 96.

While our invention has been described hereinabove in considerable detail, it is to be understood that we do not wish to be limited to the specific details of construction set forth but only by the spirit and scope of the following claims.

We claim:
1. In a wheel supported electrically powered lawn implement: a motor housing; a motor mounted within said housing having an armature shaft with one end extending outwardly through an end wall of said housing, said end wall having an air exhaust passage therethrough; a cutter blade coaxially drivably mounted on said one end of said shaft outside of said end wall and adjacent said exhaust passage so that said cutter blade is in the path of air exhausted through said air exhaust passage of said motor housing; an elongated tubular handle connected at a lower end to said housing and having fluid communication at said lower end with the interior of said housing, said handle having a plurality of spaced openings formed therein at positions spaced above said housing for admitting air into said handle for delivery into said housing through said lower end of said handle; and air impeller means within said housing mounted coaxially on said armature shaft in driven engagement with said shaft for drawing air from said handle to cool said motor and to exhaust air through said air exhaust passage of said housing and against said cutter blade.

2. In an electrically powered lawn implement: a motor housing; a motor mounted within said housing comprising an armature on a drive shaft within a field assembly, said field assembly comprising a plurality of generally horseshoe shaped plates assembled in contacting relationship to provide a pair of laminated poles on diametrically opposite generally upper and lower sides of said armature, said plates in their central portions having a field coil mounted therearound, said field coil being horizontally adjacent said armature; a cutter blade coaxially drivingly mounted on an end of said shaft protruding outwardly through an end wall of said housing; a pair of wheels mounted on opposite ends of said housing coaxially with said shaft to support said housing in spaced relation to a ground surface, said housing having a pair of hub sections serving as journals for opposite ends of said shaft and, also, rotatably supporting said pair of wheels; and an elongated handle connected at one end to said housing at an angle adapted for maintaining said field coil out from under said armature when the free end of said handle is grasped for pushing said implement in either direction.

3. In an electrically powered lawn implement: a motor housing having an integrally formed coaxial pair of hub sections at opposite ends of said motor housing; a pair of wheels each of which is rotatably mounted on the exterior of one of said hub sections to support said housing in spaced relation to a ground surface; a motor mounted within said housing comprising an armature on a drive shaft within a field assembly, said armature shaft being journaled at opposite ends within said hub sections, coaxially with said wheels, said field assembly having a pair of arcuately and horizontally extending poles over and under said armature and interconnected within a field coil positioned horizontally adjacent said armature; a cutter blade coaxially drivably mounted on an end of said drive shaft exteriorly adjacent to one of said pair of wheels; and a handle secured to said motor housing to extend outwardly therefrom and positioned and arranged for normally controlling the attitude of said motor housing relative to a ground surface whereby to position said field coil at least as far above said ground surface as one of said poles.

4. In an electrically powered lawn implement; a motor housing; a motor mounted within said housing comprising an armature on a drive shaft within a field assembly, said field assembly having arcuately and horizontally extending poles on diametrically opposite sides of said armature and having a field coil in a horizontal position offset from said armature; a cutter blade coaxially drivingly mounted on an end of said shaft protruding outwardly through an end wall of said housing; a pair of wheels mounted upon opposite ends of said housing coaxially with said shaft to support said housing in spaced relation to a ground surface; and handle means secured to said housing for maintaining said field coil out from under said armature.

References Cited in the file of this patent

UNITED STATES PATENTS

| | | |
|---|---|---|
| 1,114,839 | Wohlrab | Oct. 27, 1914 |
| 1,806,584 | Borer | May 26, 1931 |
| 1,850,191 | Wilcox | Mar. 22 1932 |
| 2,479,460 | Becker | Aug. 16, 1949 |
| 2,540,099 | Christian | Feb. 6, 1951 |
| 2,559,738 | Schweitzer | July 10, 1951 |
| 2,939,262 | Orr | June 7, 1960 |